United States Patent
Webb

(10) Patent No.: US 6,690,364 B1
(45) Date of Patent: Feb. 10, 2004

(54) METHOD AND SYSTEM FOR ON SCREEN TEXT CORRECTION VIA PEN INTERFACE

(75) Inventor: Russell Y. Webb, San Jose, CA (US)

(73) Assignee: Palm Source, Inc., Sunnyvale, CA (US)

( * ) Notice: Subject to any disclaimer, the term of this patent is extended or adjusted under 35 U.S.C. 154(b) by 202 days.

(21) Appl. No.: 09/873,006

(22) Filed: May 31, 2001

(51) Int. Cl.7 .................................................. G09G 5/00
(52) U.S. Cl. ...................................... 345/173; 345/179
(58) Field of Search ................................ 345/173, 179, 345/182, 156, 145, 146, 174–178; 382/189, 10; 704/231; 178/18

(56) References Cited

U.S. PATENT DOCUMENTS

| | | | | |
|---|---|---|---|---|
| 5,448,475 A | * | 9/1995 | Senoo et al. ................ | 715/531 |
| 5,583,543 A | * | 12/1996 | Takahashi et al. ........... | 345/173 |
| 5,710,831 A | * | 1/1998 | Beernink et al. ............ | 382/189 |
| 6,384,815 B1 | * | 5/2002 | Huang ........................ | 345/179 |
| 6,415,256 B1 | * | 7/2002 | Ditzik ........................ | 704/231 |
| 6,525,749 B1 | * | 2/2003 | Moran et al. ................ | 345/863 |

FOREIGN PATENT DOCUMENTS

JP 406324797 A * 5/1993 ............. G06F/3/03

* cited by examiner

Primary Examiner—Vijay Shankar
Assistant Examiner—Nitin Patel
(74) Attorney, Agent, or Firm—Wagner, Murabito & Hao LLP

(57) ABSTRACT

A system and method for changing data displayed on a touch-sensitive display screen. The present system and method recognize handwritten strokes made with a stylus on the touch-sensitive display screen of a PDA or palmtop computer in order to alter or correct displayed data. In one mode of operation, computer controlled association of the location of the handwritten strokes on the display screen with one or more of the displayed characters will result in automatic replacement of those characters by the handwritten strokes. In a second mode of operation, matching at least one of the handwritten strokes with one character of the displayed data will result in replacement of one or more characters of the displayed data with the handwritten characters. With the present system and method, the number of steps required to alter displayed data is reduced to the number of handwritten strokes. A significant reduction in time and effort as well as a simplification in application is therefore offered.

16 Claims, 11 Drawing Sheets

METHOD AND SYSTEM FOR ON SCREEN TEXT CORRECTION VIA PEN INTERFACE

BACKGROUND OF THE INVENTION

1. Field of the Invention

The present invention relates to the field of portable devices such as personal digital assistants or palmtop computer systems. More specifically, embodiments of the present invention relate to the recognition and correction of displayed text.

2. Related Art

As the components required to build a computer system have reduced in size, new categories of electronic devices and computer systems have emerged. One of the new categories of computer systems is the "palmtop" computer system. A palmtop computer system is a computer that is small enough to be held in the hand of a user and can therefore be "palm-sized." Most palmtop computer systems are used to implement various Personal Information Management (PIM) applications such as an address book, a daily organizer (calendar, date book, etc.) and electronic notepads, to name a few. Palmtop computers with PIM software have been known as Personal Digital Assistants (PDAs). Many PDAs have a small and flat display screen associated therewith.

User convenience and device value are very important factors for portable electronic devices. Typically, portable electronic devices are employed while the user is on the run, e.g., in business meetings, on business travel, personal travel, in a vehicle, on foot, etc. Because the user may be occupied or busy while using the portable electronic device, the number of user steps or user tasks required in order to access information from an electronic device (or to store information into the electronic device) is crucial for producing a commercially successful and useful product. That is, the more difficult it is to access data from an electronic device, the less likely the user will perform those tasks to obtain the information. Likewise, the easier information is to obtain, the more likely the portable electronic device will be used to obtain that information and the more likely the portable electronic device will become a part of the user's everyday activities.

Similarly, the more difficult it is to enter data into an electronic device, the less likely the user will perform those tasks required to communicate information. The easier it is to input information, the more likely the portable electronic device will be used to communicate that information and the more likely the portable electronic device will become a part of the user's everyday activities. A stylus is frequently utilized in an on-screen handwriting system to enter data into a PDA. An important aspect of this operation is the ease with which the user can alter or correct such written information. The current state of the art is to move a visual selection tool or cursor around the screen and edit via the same mechanism that was used to enter the original text or data, however, extra strokes or entry actions are required to perform character deletions, etc.

The ability to modify information displayed on a touch-sensitive display screen, such as spelling errors or perhaps inaccurate numerical data, is an important function. Since the characters used to display information on the screen are relatively small, the spacing between characters is also quite small. This adds to the difficulty of locating, identifying and correcting a single character or groups of characters displayed on a display screen. One conventional method for allowing a user to correct mistakes requires that entire words be corrected at once. In effect, the user is required to identify a larger segment of information (for example a complete word) that is then displayed in magnified form for correction on the screen. However, there are many instances were only one character may be mistaken in a large word. It is very inconvenient to require a user to re-enter an entire word if just one character is mistaken.

Other correction techniques require that the user position a visual correction tool, e.g., a cursor, near the character to be corrected. The difficulty with the conventional correction methods involves the amount of time and effort required. For instance, to correct one mistake may require three to four separate actions, often in three disparate areas of the screen or device. For example, the user needs to position the cursor, perform a delete, reenter the new character, and then reposition at a last location. Therefore, existing systems and methods for accomplishing text correction are generally multiple step operations, and they generally are limited to altering only one character at a time. What is needed is a mechanism and method for allowing a user to easily make corrections with respect to displayed text without requiring the number of steps required of the cursor approach described above.

SUMMARY OF THE INVENTION

Accordingly, what is needed is a more generally applicable method or system that provides for more user friendly on-screen alterations or corrections of displayed information. What is also needed is a method or system that will allow operation on one or more characters, as well as replacement of portions of displayed information, in terms of the location of the information on the display screen. In addition, what is needed is a method or system that will function properly in response to handwritten strokes made on a touch screen by a user. What is also needed is a method or system that simplifies the alteration or correction process by reducing the number of steps required in existing methods and systems.

Just as one would make a voice correction by back tracking and repeating some of the correct information to provide context for where to place a correction, embodiments of the present invention use location and repetition of context to allow in-place correction of text on-screen without changing the input state of the device by persistently moving the cursor or creating selections of text (both of which are error prone due to the accuracy of pen placements required).

This correction recognizer is capable of using any handwriting system the user employs. The user simply rewrites the text to be corrected at the approximate on-screen location where the correction should take place. A user may have to repeat one or more correct characters to make the correction unique. The system then compares the new handwriting against the existing text to locate a match between them for at least one or more characters.

Audible feedback may be incorporated so the user will know when this match is found. A heuristic of placing the new text at the location where the best match is found is used. For instance, if you write "your right" and you need to correct it to "you're right" then writing ('re) may not be enough since there are two r's near each other. Writing ('re) (with a space) would be enough, or (u're) would work. This allows the user to naturally correct just as they are used to when spelling words or numbers out vocally. A cursor or other correction tool is not required to make the correction.

A system and method for changing data displayed on a touch-sensitive display screen are described. The ability to modify information displayed on a touch-sensitive display screen, such as spelling errors or perhaps inaccurate numerical data, is an important function. Existing systems and methods for accomplishing this function are generally multiple step operations, and they generally are limited to altering only one character at a time. The present system and method recognize handwritten strokes made with a stylus on the touch-sensitive display screen of a PDA or palmtop computer in order to alter or correct displayed data. The present system and method is equally applicable with a display system in which a cursor is used to write handwritten strokes.

In one mode of operation, associating the location of the handwritten strokes on the display screen with one or more of the displayed characters will result in replacement of those characters by the handwritten (correction) strokes. In a second mode of operation, matching at least one of the handwritten strokes with one character of the displayed data will result in replacement of one or more characters of the displayed data with the handwritten characters. With the present system and method, the number of steps required to alter displayed data is reduced to the number of handwritten strokes. A significant reduction in time and effort as well as a simplification in application is therefore offered.

In one embodiment of the present invention, a portion of text to be modified is displayed on a touch-sensitive display screen. The input cursor is located at the end of the field of text. A stylus is used to handwrite a substitute character on the touch-sensitive display screen as the replacement for an existing character in the displayed text. Locating a portion of the handwritten stroke near an existing character on the display screen causes the system to examine this existing text nearby to identify the character to be replaced. Once a match is found between the correction text and the existing text, the substitute character is then automatically inserted in place of the existing character. It is possible to input more than one handwritten stroke at a time, thus allowing for simultaneous replacement of multiple characters.

In a second embodiment of the present invention, a portion of text to be modified is displayed on a touch-sensitive display screen. The input cursor is located at the end of the field of text. A stylus is used to handwrite one or more substitute characters on the touch-sensitive display screen as the replacement for a portion of the displayed text. It is appreciated that the replacement characters may be written in electronic ink over the text that is to be corrected. Locating one handwritten character in the vicinity of a similar existing character on the display screen identifies the position at which the replacement characters are to be inserted. Upon finding a match between a replacement character and an existing character, the substitute characters are automatically inserted in place of the existing characters with the matching characters occupying a similar location. The present system thus allows for replacement of portions of text composed of multiple characters.

DETAILED DESCRIPTION OF THE INVENTION

Figure 1A:
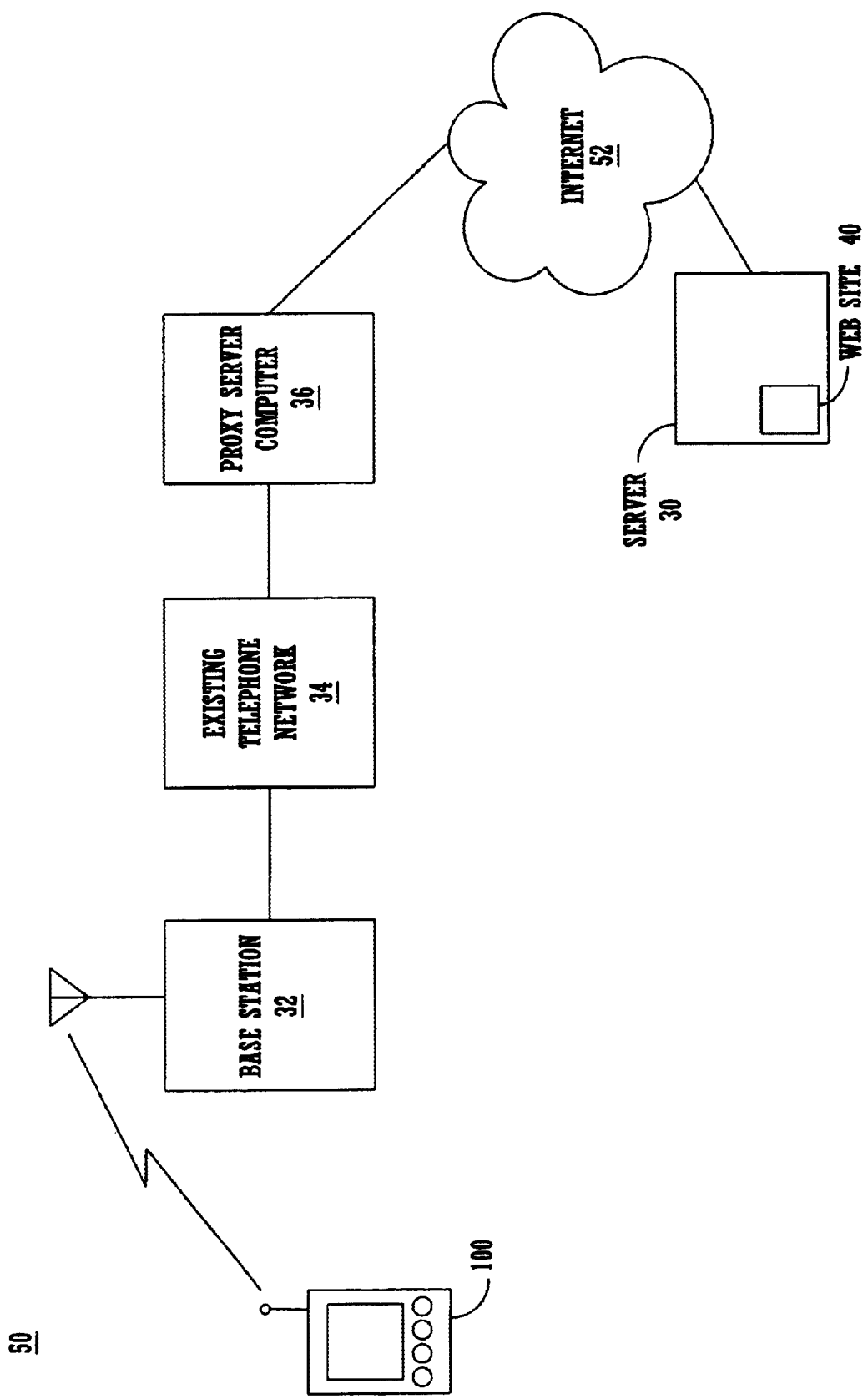
FIG. 1A is a block diagram of an exemplary network environment including a portable computer system.

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

NOTATION AND NOMENCLATURE

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining" or "indicating" or "indexing" or "receiving" or "performing" or "initiating" or "sending" or "implementing" or "disabling" or "enabling" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention is discussed primarily in the context of a portable computer system, such as a palmtop or personal digital assistant, with the capability to access via the Internet a World Wide Web ("Web") site residing on a server computer system. However, it is appreciated that the present invention can be used with other types of devices that have a display screen and allow handwriting recognition as an input mechanism, including but not limited to laptop computer systems, cell phones, pagers, etc.

EXEMPLARY PALMTOP PLATFORM

FIG. 1A is a block diagram of an exemplary network environment 50 including a portable computer system 100. Portable computer system 100 is also known as a palmtop or palm-sized computer system or as a personal digital assistant (PDA). In one embodiment, portable computer system 100 has the ability to transmit and receive data and information over a wireless communication interface (e.g., a radio interface). In one embodiment, the wireless communication interface is integrated into portable computer system 100; in another embodiment, the wireless communication interface is accomplished with a wireless modem attachment (not shown).

In the present embodiment, base station 32 is both a transmitter and receiver base station, which can be implemented by coupling it into an existing public telephone network 34. Implemented in this manner, base station 32 enables portable computer system 100 to communicate with a proxy server computer system 36, which is coupled by wire to the existing public telephone network 34. Furthermore, proxy server computer system 36 is coupled to the Internet 52, thereby enabling portable computer system 100 to communicate with the Internet 52. Coupled with Internet 52 are multiple servers exemplified by server 30. Residing on server 30 is a Web site 40. When communicating with a Web site over Internet 52, protocols such as CTP (Compact Transport Protocol) and CML (Compact Markup Language) can be used by portable computer system 100 in the present embodiment.

It should be appreciated that within the present embodiment, one of the functions of proxy server 36 is to perform operations over the Internet 52 on behalf of portable computer system 100. For example, proxy server 36 has a particular Internet address and acts as a proxy device for portable computer system 100 over the Internet 52.

It should be further appreciated that other embodiments of a communications network, planned or envisioned, may be utilized in accordance with the present invention. For example, a wireless connection may be made from portable computer system 100 directly to the Internet 52.

The data and information that are communicated between base station 32 and portable computer system 100 is the same type of information and data that can conventionally be transferred and received over a public telephone wire network system. However, a wireless communication interface is utilized to communicate data and information between portable computer system 100 and base station 32. It should be appreciated that one embodiment of a wireless communication system in accordance with the present invention is the Mobitex wireless communication system.

FIGS. 1 B is a block diagram showing another embodiment of a system 51 for coupling a portable computer system 100 to other computer systems and to the Internet 52 in accordance with the present invention. System 51 is described in the context of wired connections between its various devices and components; however, it is appreciated that wireless connections (such as but not limited to Bluetooth wireless connections) can also be used.

With reference first to FIG. 1 B, system 51 comprises a host computer system 56 which can either be a desktop unit as shown, or, alternatively, can be a laptop system 58. Optionally, one or more host computer systems can be used within system 51. Host computer systems 58 and 56 are shown connected to a communication bus 54 such as an Ethernet Local Area Network (LAN), but which can instead be any of a number of other types. Bus 54 can provide communication with the Internet 52 using a number of well-known protocols. Coupled with Internet 52 are multiple servers exemplified by server 30. Residing on server 30 is a Web site 40.

Importantly, in the present embodiment, host computer system 56 is also coupled via connector cable 68 to a cradle 60 for receiving and initiating communication with portable computer system 100 ("handheld computer") of the present invention. Connector cable 68 can be a serial bus (e.g., RS232), a parallel bus, a Universal Serial Bus (USB), or any other type of workable connection. Cradle 60 provides an electrical and mechanical communication interface between connector cable 68 and portable computer system 100 for two-way communications with host computer system 56. Portable computer system 100 also contains a wireless infrared communication mechanism 64 for sending and receiving information from other devices.

Figure 2:
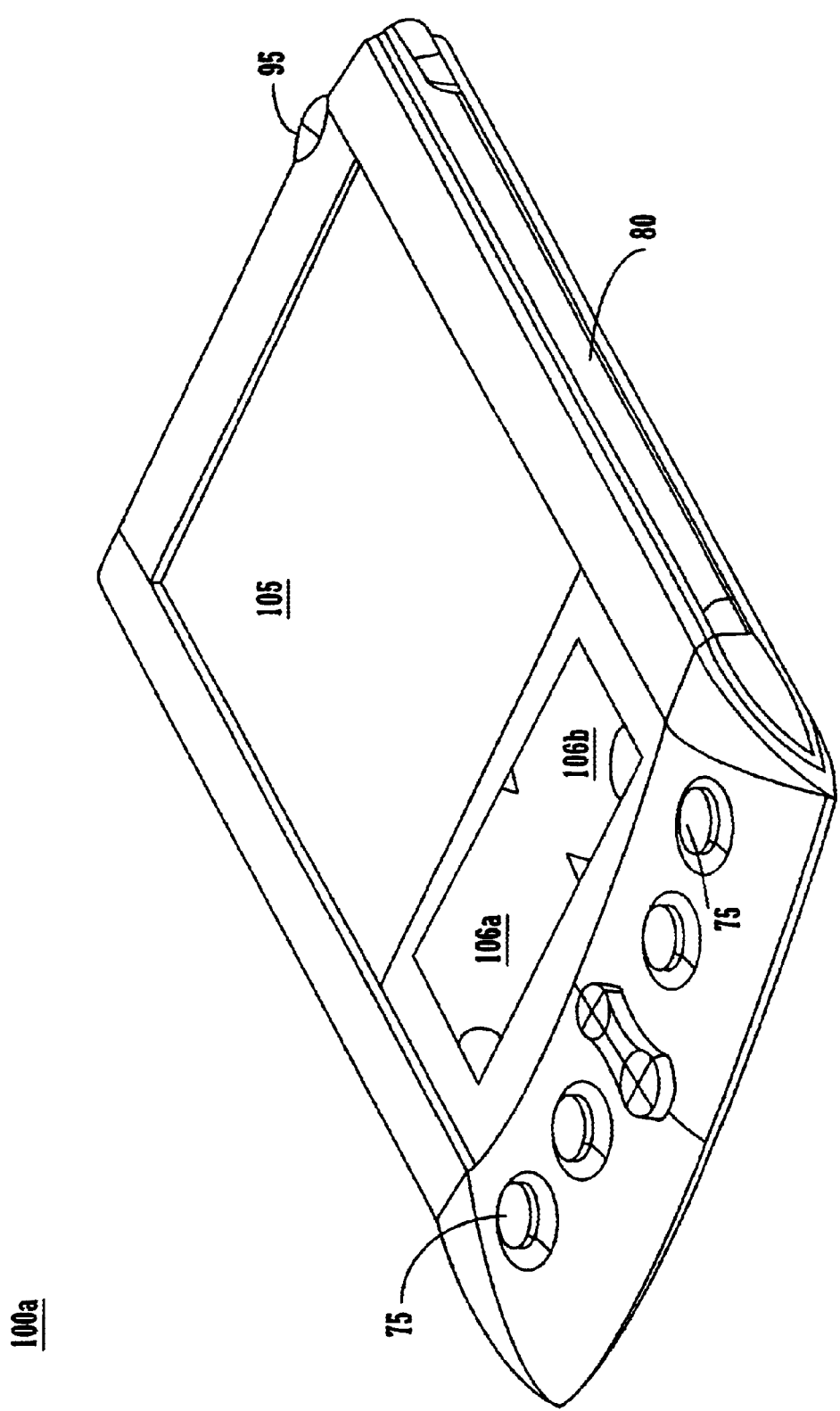
FIG. 2 is a topside perspective view of an exemplary portable computer system.

FIG. 2 is a perspective illustration of the top face 100a of one embodiment of an exemplary palmtop computer system 100. The top face 100a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 2 also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a and The stroke information is then fed to an internal processor for automatic character recognition. Once characters are recognized, they are typically displayed on the screen 105 for verification and/or modification.

Figure 3:
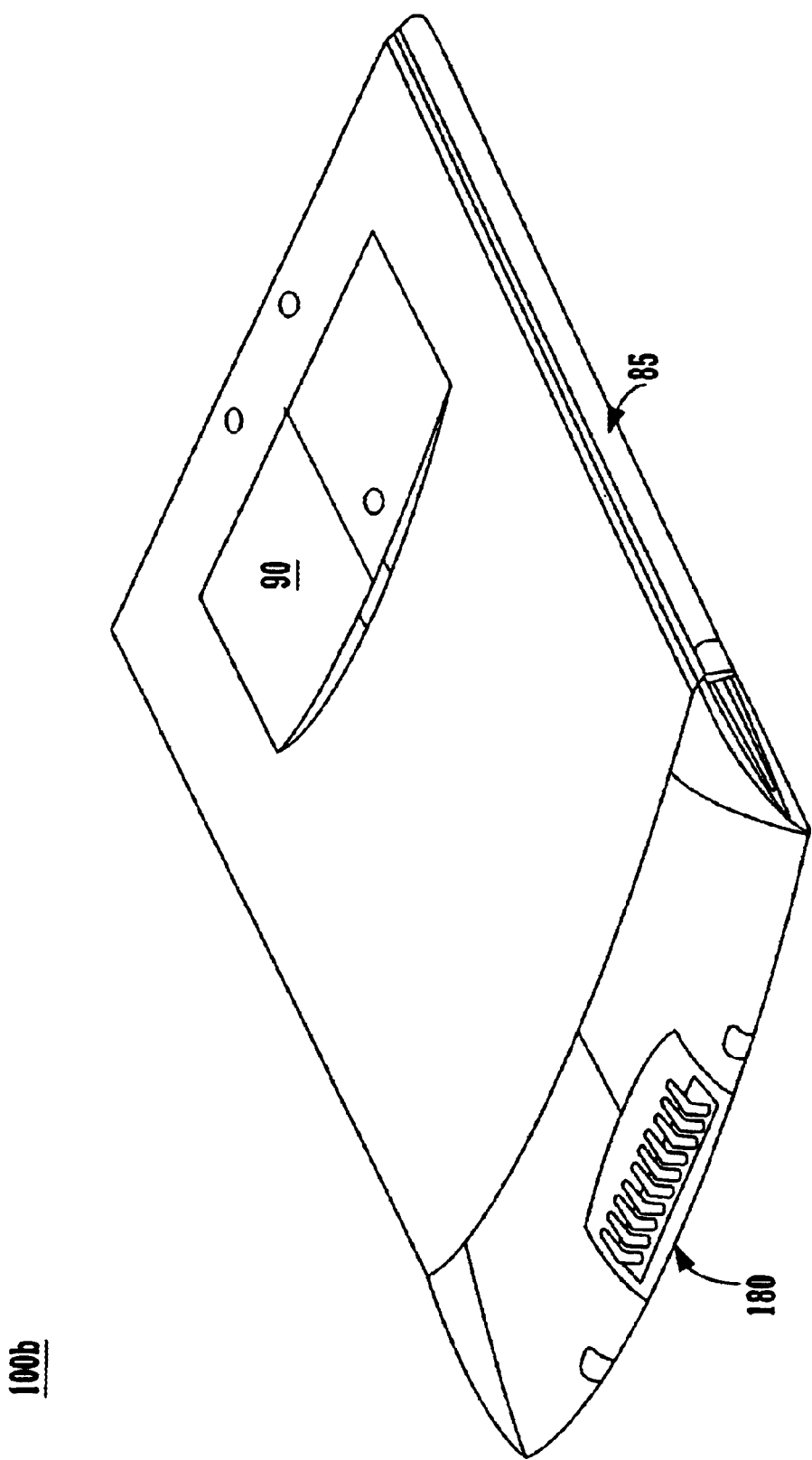
FIG. 3 is a bottom side perspective view of the exemplary portable computer system of FIG. 2.

FIG. 3 illustrates the bottom side 100b of one embodiment of the palmtop computer system that can be used in accordance with various embodiments of the present invention. An extendible antenna 85 is shown, and also a battery storage compartment door 90 is shown. A communication interface 180 is also shown. In one embodiment of the present invention, the communication interface 180 is a serial communication port, but could also alternatively be of any of a number of well-known communication standards and protocols, e.g., parallel, SCSI (small computer system interface), Firewire (IEEE 1394), Ethernet, etc.

Figure 4:
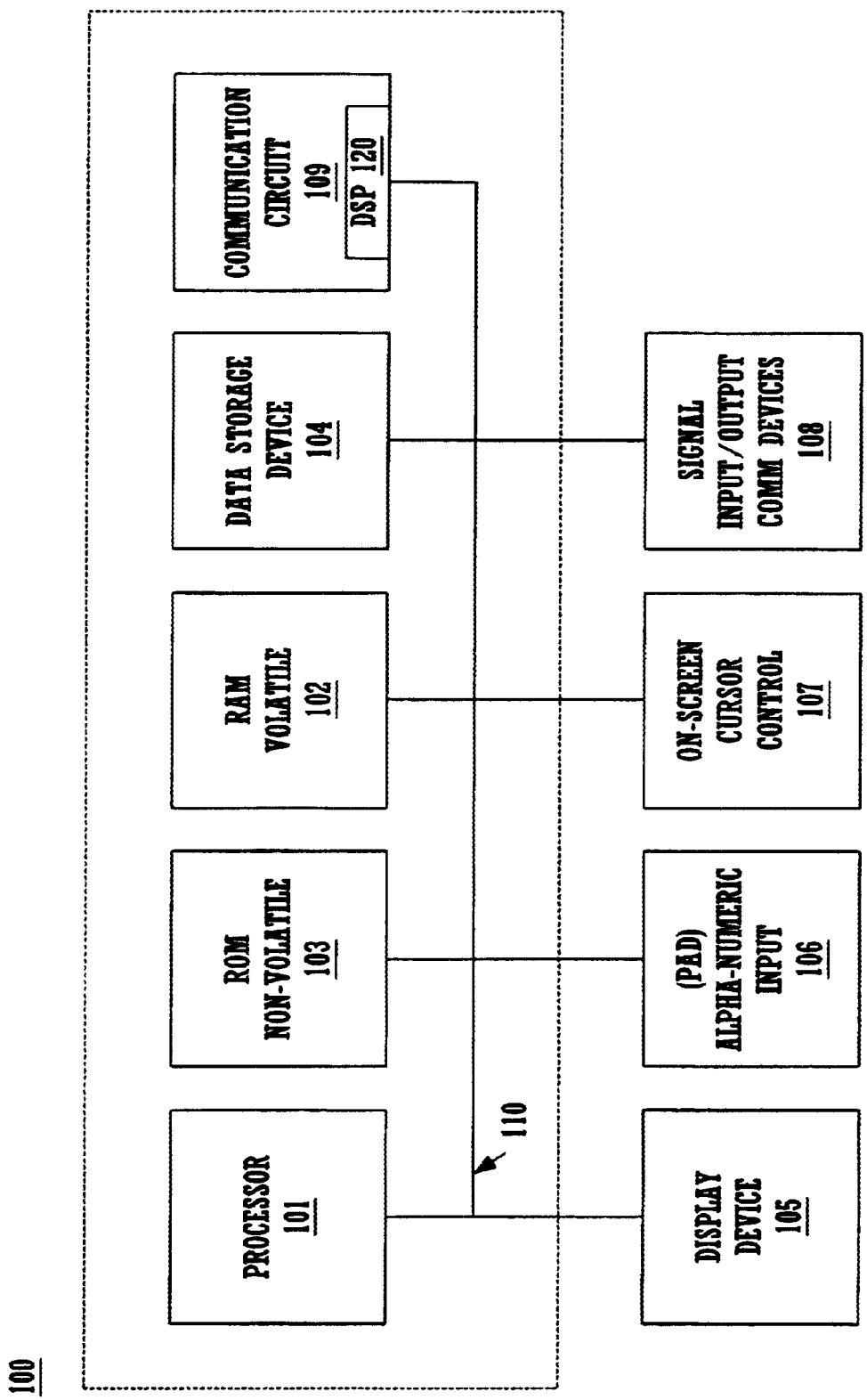
FIG. 4 is a block diagram of one embodiment of the exemplary portable computer system.

FIG. 4 illustrates circuitry of computer system 100. Computer system 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a non-volatile memory 103 (e.g., read only memory, ROM) coupled with the bus 110 for storing static information and instructions for the processor 101. Computer system 100 also includes an optional data storage device 104 (e.g., memory stick) coupled with the bus 110 for storing information and instructions. Device 104 can be removable. As described above, computer system 100 also contains a display device 105 coupled to the bus 110 for displaying information to the computer user. PC board 225 can contain the processor 101, the bus 110, the ROM 103 and the RAM 102.

Figure 1B:
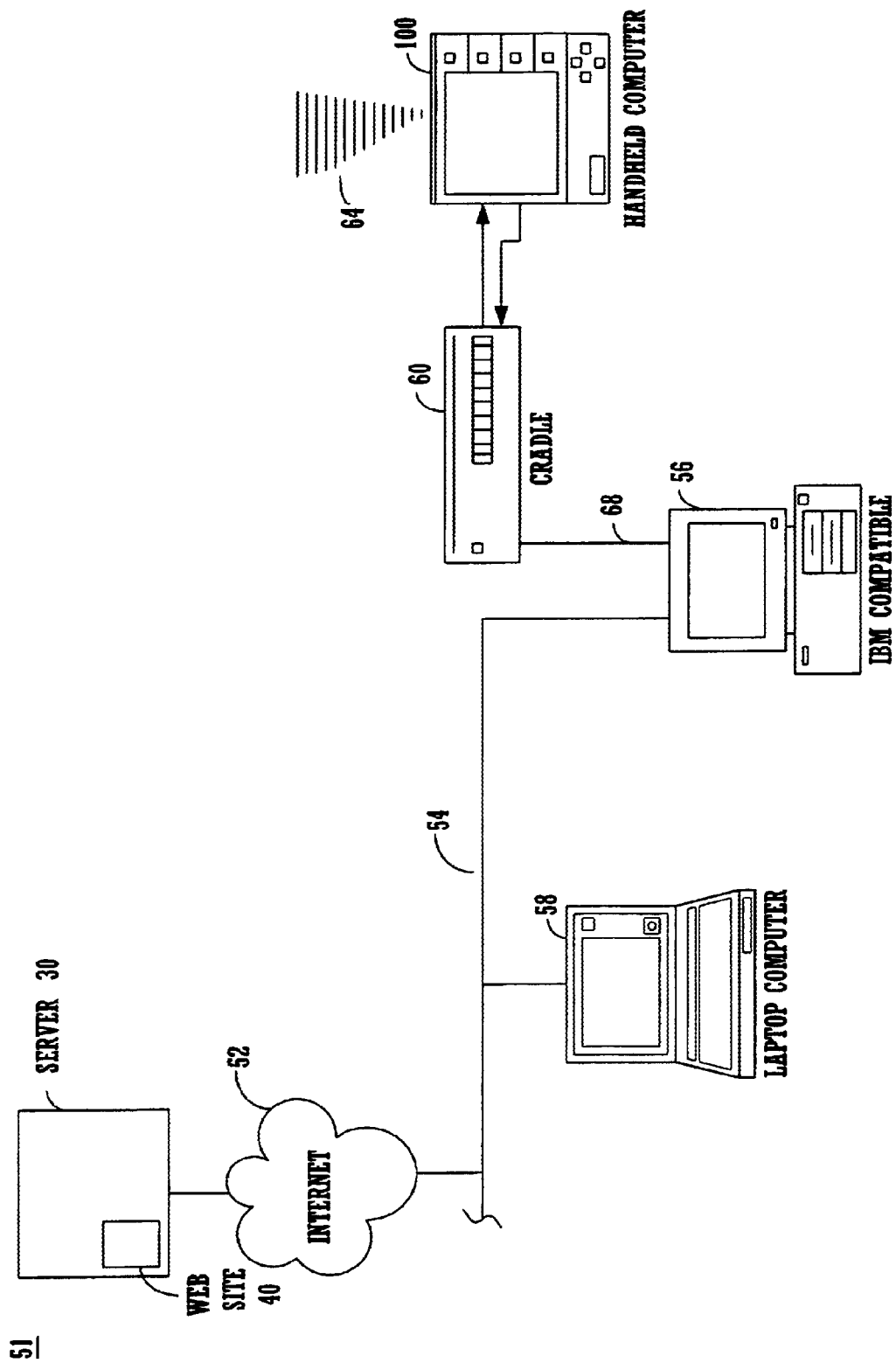
FIG. 1B is a block diagram showing another embodiment for coupling a portable computer system to other computer systems and to the Internet.

With reference still to FIG. 4, computer system 100 also includes a signal transmitter/receiver device 108, which is coupled to bus 1 10 for providing a physical communication link between computer system 100, and a network environment (e.g., network environments 50 and 51 of FIGS. 1A through 1B). As such, signal transmitter/receiver device 108 enables central processor unit 101 to communicate wirelessly with other electronic systems coupled to the network. It should be appreciated that within the present embodiment, signal transmitter/receiver device 108 is coupled to antenna 85 (FIG. 4) and provides the functionality to transmit and receive information over a wireless communication interface. It should be further appreciated that the present embodiment of signal transmitter/receiver device 108 is well suited to be implemented in a wide variety of ways. For example, signal transmitter/receiver device 108 could be implemented as a modem.

In one embodiment, computer system 100 includes a communication circuit 109 coupled to bus 110. Communication circuit 109 includes an optional digital signal processor (DSP) 120 for processing data to be transmitted or data that are received via signal transmitter/receiver device 108. Alternatively, processor 101 can perform some or all of the functions performed by DSP 120.

Also included in computer system 100 of FIG. 4 is an optional alphanumeric input device 106 that in one implementation is a handwriting recognition pad ("digitizer") having regions 106a and 106b (FIG. 2), for instance. Alphanumeric input device 106 can communicate information and command selections to processor 101. Computer system 100 also includes an optional cursor control or directing device (on-screen cursor control 107) coupled to bus 110 for communicating user input information and command selections to processor 101. In one implementation, on-screen cursor control device 107 is a touch screen device incorporated with display device 105. On-screen cursor control device 107 is capable of registering a position on display device 105 where the stylus makes contact. The display device 105 utilized with computer system 100 may be a liquid crystal display device, a cathode ray tube (CRT), a field emission display device (also called a flat panel CRT) or other display device suitable for generating graphic images and alphanumeric characters recognizable to the user. In the preferred embodiment, display device 105 is a flat panel display.

Figure 5:
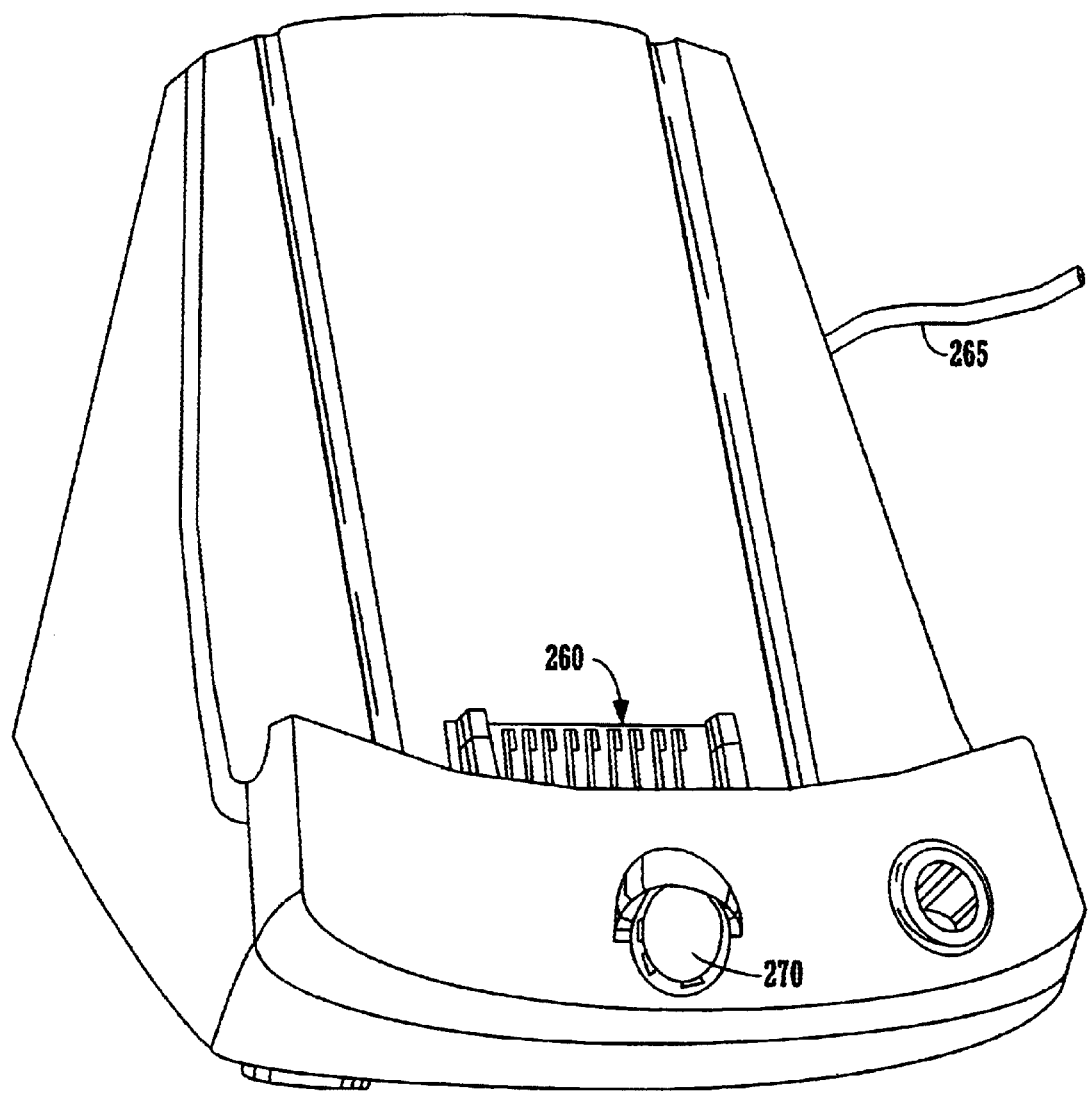
FIG. 5 is a perspective view of the cradle device for connecting the exemplary portable computer system to other systems via a communication interface in accordance with one embodiment of the present invention.

FIG. 5 is a perspective illustration of one embodiment of the cradle 60 for receiving the palmtop computer system 100. Cradle 60 contains a mechanical and electrical interface 260 for interfacing with communication interface 108 (FIG. 3) of computer system 100 when system 100 is slid into the cradle 60 in an upright position. Once inserted, button 270 can be pressed to initiate two-way communication (e.g., a communication session) between computer system 100 and other computer systems coupled to serial communication 265.

On-Screen Text Correction of the Present Invention

Figure 6A:
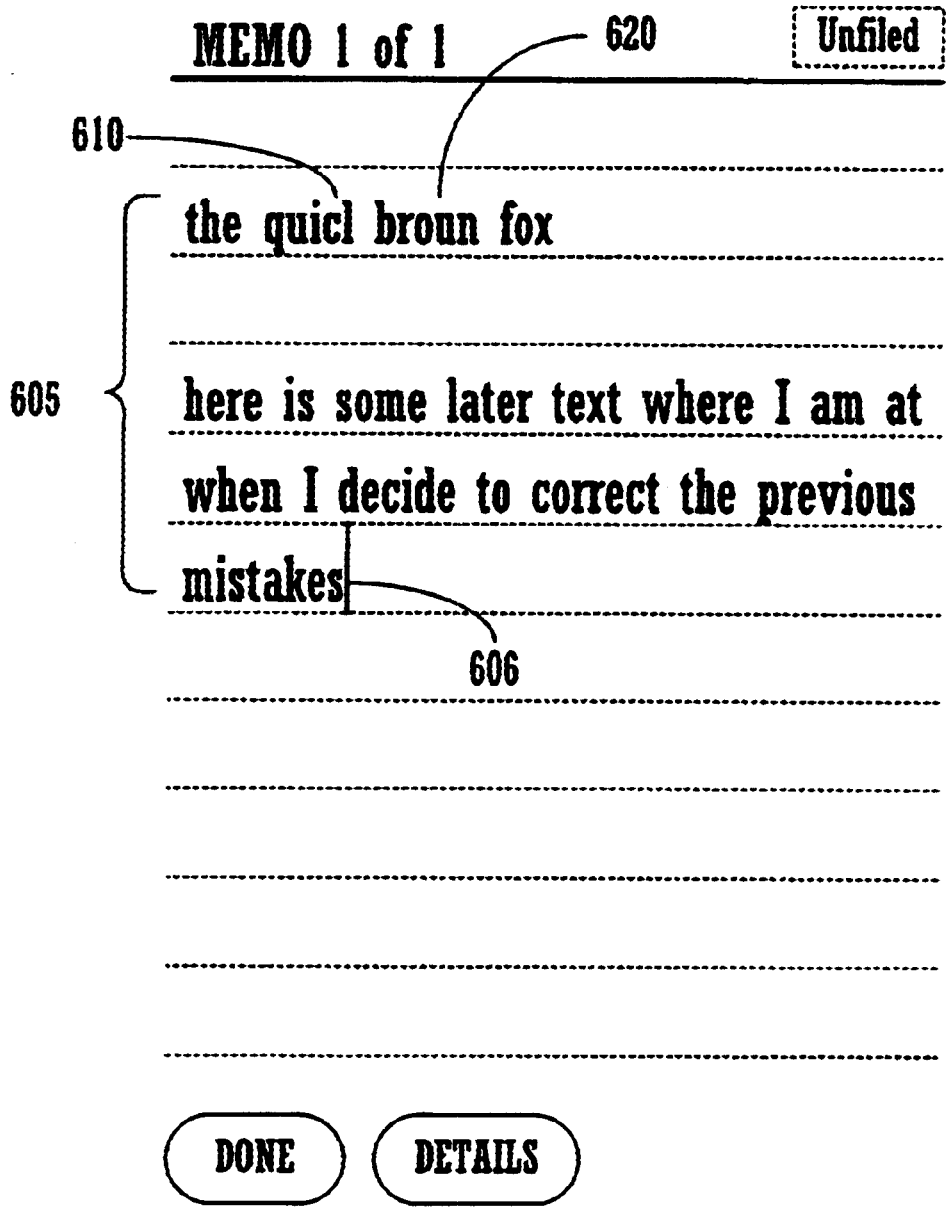
FIG. 6A illustrates errors in text displayed on a touch-sensitive display screen according to an embodiment of the present invention.

FIG. 6A illustrates an on-screen display (e.g., of a PDA or other portable computing device) including errors in a field of text 605 displayed on a touch-sensitive display screen 600 according to the present invention. The input cursor 606 is located at the end of the field. The first error noted 610 is the letter "I" in the misspelled word "quic," which of course should be the letter "k." The second error 620 is the letter "u" in the misspelled word "broun", which of course should be the letter "w."

Figure 6B:
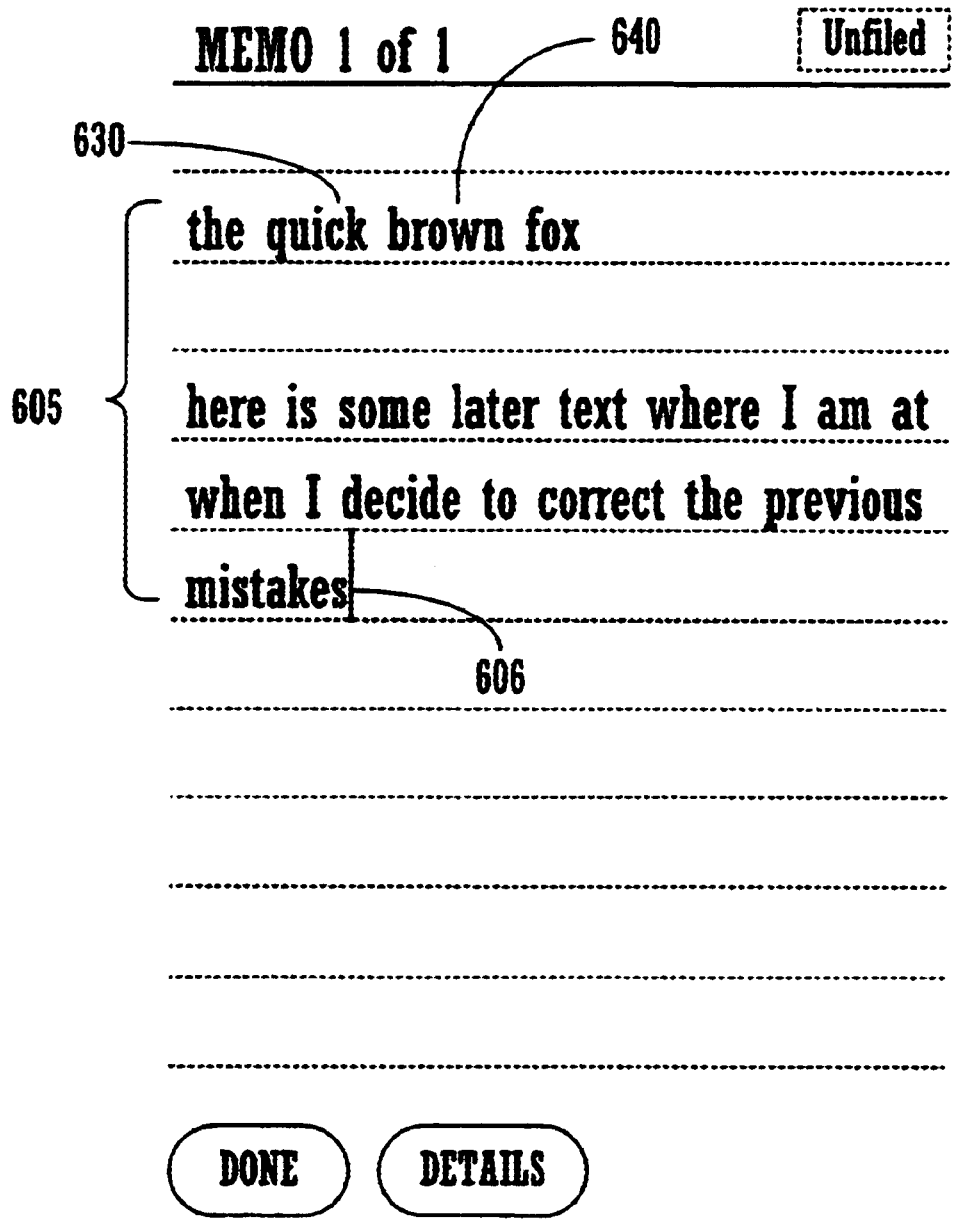
FIG. 6B illustrates text as displayed on a touch-sensitive display screen in FIG. 6A in which errors have been corrected according to an embodiment of the present invention.

FIG. 6B illustrates text as displayed on a touch-sensitive display screen in FIG. 6A 605 in which errors have been corrected according to the present invention. The input cursor 606 is located at the end of the field. The letter "k" 630 has been inserted to correct the spelling of the work "quick." The letter "w" 640 has been inserted to correct the spelling of the word "brown."

Figure 7:
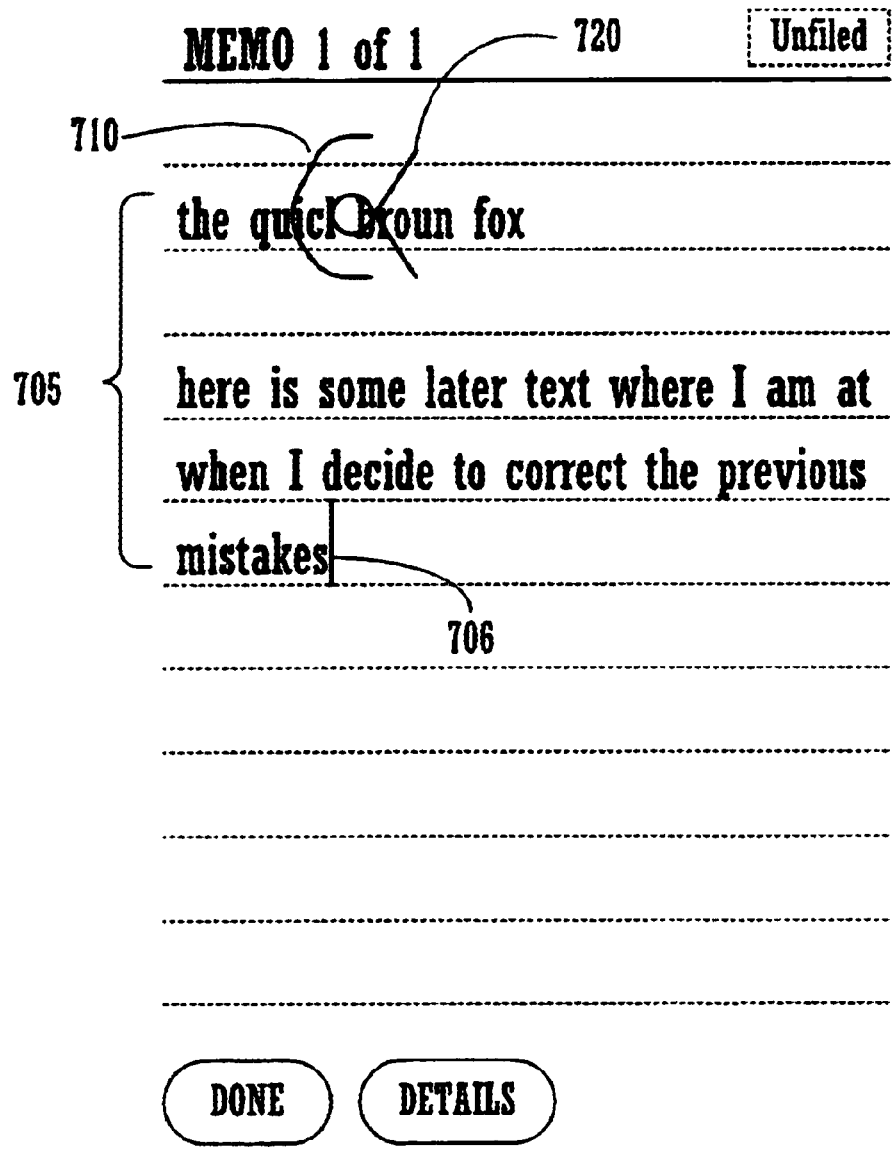
FIG. 7 illustrates the placement of letters formed by handwritten strokes to be inserted in place of incorrect letters in existing text displayed on a touch-sensitive display screen according to an embodiment of the present invention.

FIG. 7 illustrates the placement of letters formed by handwritten strokes 700 to be inserted in place of incorrect letters in existing text displayed on a touch-sensitive display screen according to the present invention. The text containing errors 705 is at the top of the field, and the cursor 706 is located at the bottom of the field. In this illustration, the erroneous letter "I", 610 in FIG. 6A, is to be replaced with the correct letter "k."

To perform this correction using the invention, the user uses a stylus to handwrite the letter "c" 710 in proximity to the letter "c" in the existing word "quicl." Again, using a stylus, the user handwrites the letter "k" 720 adjacent to and to the right side of the letter "c" 710. In these cases, the user is writing directly on the touch sensitive screen 105 (FIG. 4). After a brief pause in writing (or until the system determines an unambiguous match between the correction characters and the existing text), the system then recognizes that the user has stopped entering correction characters ("c and k"). This causes the system to identify the text that is nearby the correction characters and identify matches between the correction characters and characters of the text. Detecting a match between the written letter " c" 710 and the existing letter "c", causes characters in the word "quic" beginning with and following the existing letter "c" to be replaced with the handwritten letters "c" and "k." The misspelled word "quic" has thus been corrected to "quick."

More particularly, the computer system recognizes the match between the "c" and determined that "ck" (the correction text) would replace "cl." A correction cursor is not required. Specific deletion steps are also not required.

Figure 8:
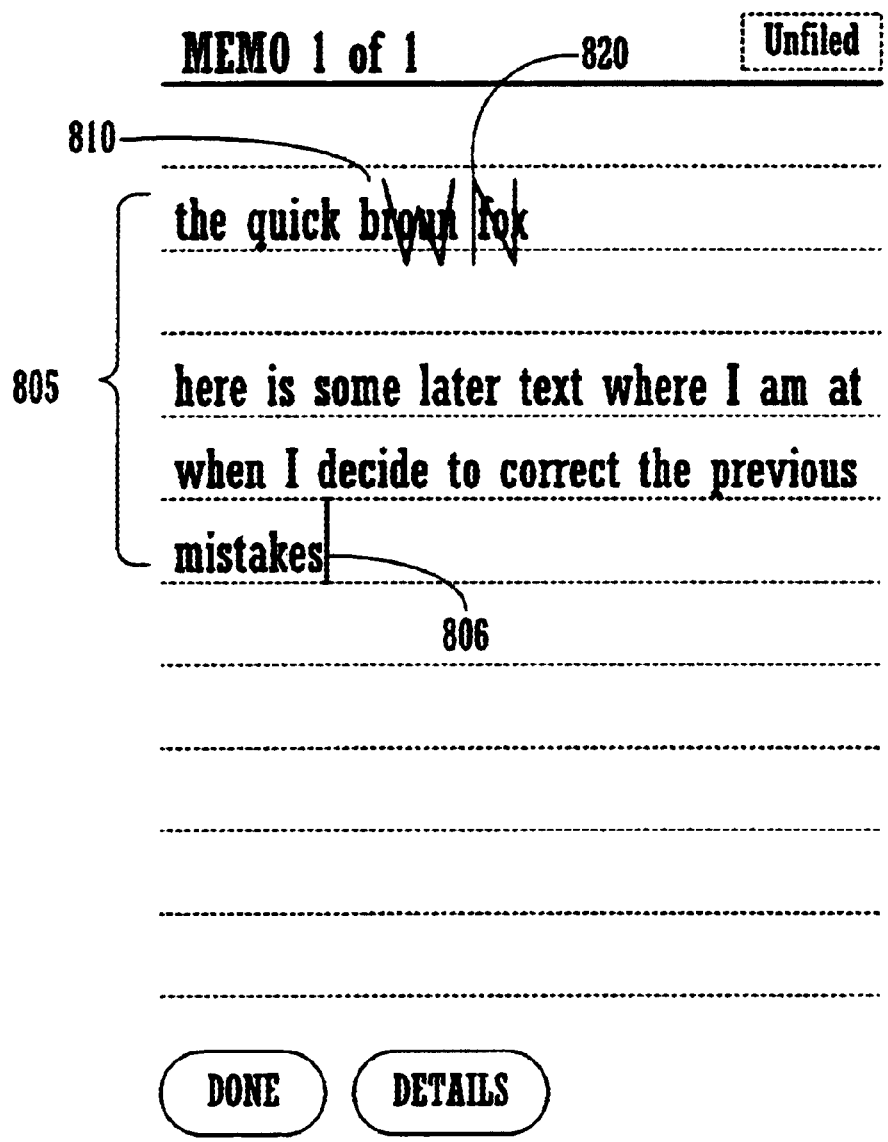
FIG. 8 illustrates the placement of letters formed by handwritten strokes to be inserted in place of incorrect letters in existing text displayed on a touch-sensitive display screen according to an embodiment of the present invention.

FIG. 8 illustrates the placement of letters formed by handwritten strokes 800 to be inserted in place of incorrect letters in existing text displayed on a touch-sensitive display screen according to the present invention. The text containing errors 805 is at the top of the field, and the cursor 806 is located at the bottom of the field. In this illustration, the erroneous letter "u", 620 in FIG. 6A, is to be replaced with the correct letter "w." Using a stylus, the user handwrites the letter "w" 810 in proximity to the letter "u" in the existing word "broun." Again, using a stylus, the user handwrites the letter "n" 820 adjacent and to the right side of the letter "w" 810.

In accordance with embodiments of the present invention, detecting a match between the written letter "n" 820 and the existing letter "n", causes characters in the word "broun" beginning with and preceding the existing letter "n" to be replaced with the handwritten letters "w" and "n." The misspelled word "broun" has thus been corrected to "brown." A correction cursor is not required. Specific deletion steps are also not required.

Figure 9:
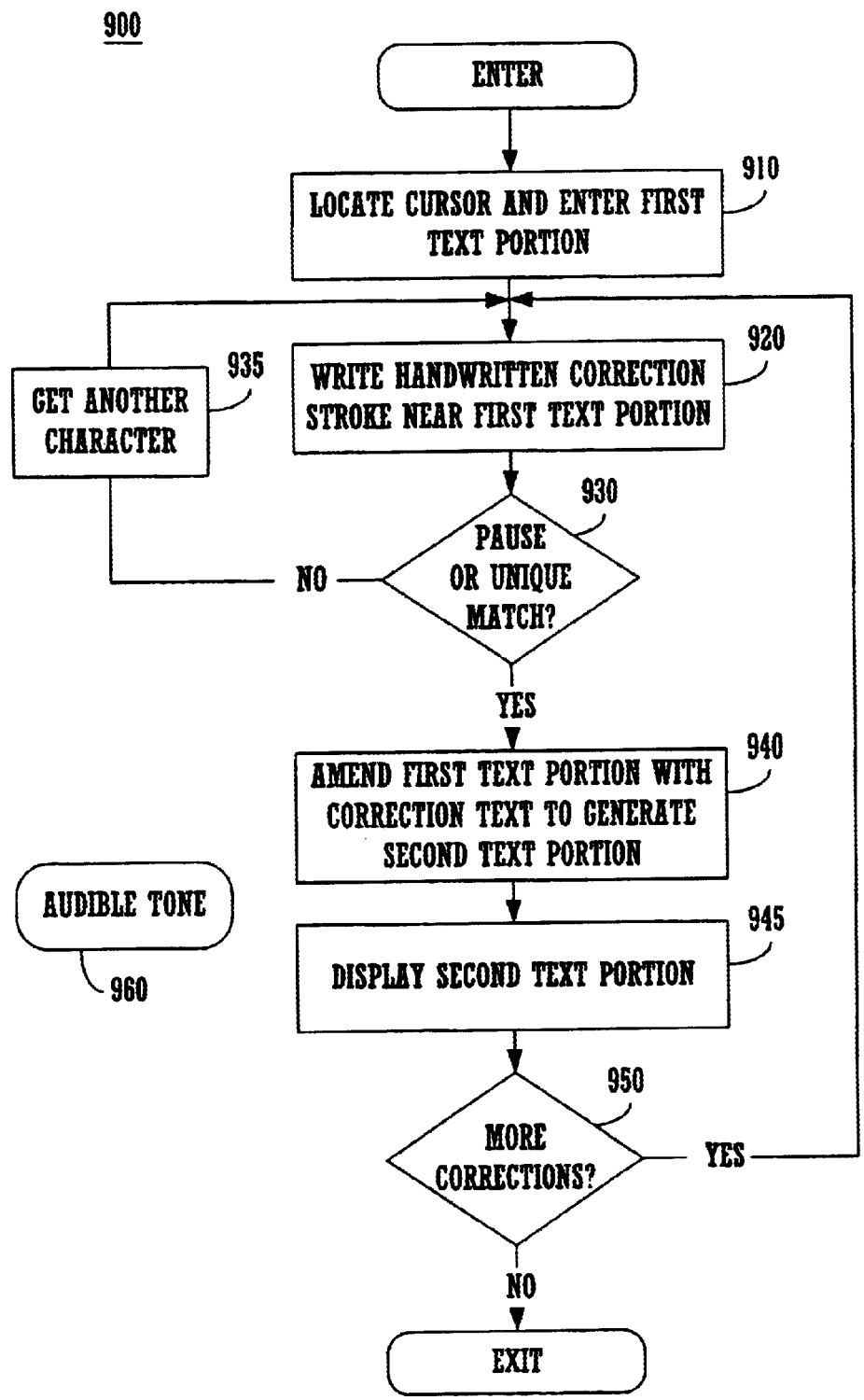
FIG. 9 is a flowchart showing steps in a process for modifying data displayed on a touch-sensitive display screen according to an embodiment of the present invention.

FIG. 9 is a flowchart 900 showing steps in a process for modifying data displayed on a touch-sensitive display screen according to an embodiment of the present invention. The steps of process 900 may be implemented as memory resident computer code executed by processor 101.

At step 910, a first text portion is entered, e.g., by a user. The cursor may be used to enter this first text portion, e.g., by directing entry of the characters into a specific on-screen window or data entry field. In this first text portion there is assumed to be a mistake that needs to be corrected. A portion of data to be modified is identified as a group of adjacent characters separated on each side from other characters by one or more anchor characters, e.g., spaces (a single word for example). In step 910, the user may leave the cursor at the end of the field in which the data to be modified is located.

At step 920, a user enters the modification mode of operation by positioning the cursor over the first text portion and then stroking the stylus to enter a correction character. The user stroking a stylus on the surface of the touch-sensitive screen in step 920 forms a replacement or correction character in the vicinity of an existing character to be modified or in the vicinity of a word containing an error therein. The correction characters may be written (e.g., graphically displayed) over the first text portion (e.g., using electronic ink). At step 930, if no pause is encountered after the correction character is entered, or, if no unambiguous match is found between the correction character and the first text portion, then step 935 and step 920 are entered to allow the user to enter another correction character. It is appreciated that as the correction characters are being written, automatic handwriting recognition processes are being applied to recognize them.

After a recognized pause, the system will compare the correction characters against the first text portion to locate an unambiguous match and then step 940 is entered. The computer system examines the correction characters that were just entered against the text (e.g., first text portion) that is nearby the correction characters in order to locate a unique match between the correction characters and the existing text. This may cause an audible tone to be generated. If a match is located, then the computer system (at step 940) replaces a portion of the existing text with the correction text. For instance, with respect to the work "quic," the matching character was "c" and the text "cl" was replaced by the correction text "ck."

Alternatively, at step 930, even if there is no pause, the system may locate an unambiguous match (at step 930) between the correction characters and the first text portion thereby causing step 940 to be entered.

At step 940, the correction characters are automatically inserted into the first text portion in place of existing characters using the matching characters for proper location and character alignment. This generates a second text portion. At step 945, the second text portion is displayed on the screen and an audible tone may occur. If more corrections are required, step 920 can be entered again. Step 950 allows the opportunity to perform additional modifications in a selected portion of data, in which case, the system remains in the modification mode by returning to step 920. If no additional modifications are requested, the system exits the modification mode.

Within process 900, the processor examines the nearby text for anchor points that match the correction text. In one embodiment, the processor will replace all text from an anchor point to the end of a word, e.g., as determined by a space, period or comma, etc. In the following example, the existing text is "your" and the correction text is "rs" which yields "yours" on correction. The anchor is "r" and the correction continues until the end of the word is reached. In another embodiment, the processor will replace all text located between two recognized anchor points. In the following example, the existing text is "elephint." The correction text is "han" yielding "elephant" on correction. The anchor characters are "h" and "n" thereby causing all characters in between to be replaced. In another embodiment, the processor will replace all text that precedes an anchor point. In the following example, the existing text is "nungry" and the correction text is "hu" which yields "hungry" on correction. The anchor is "u" and the correction continues backwards the start of the word is reached.

Also, a handwritten character stroke that directly overlies an existing character may replace that single character. A handwritten character that is identified as similar to an existing character replaces that existing character, and any handwritten characters to the right of the similar handwritten character replace existing characters in corresponding positions to the right of the similar existing character. A handwritten character that is identified as similar to an existing character replaces that existing character, and any handwritten characters to the left of the similar handwritten character replace existing characters in corresponding positions to the left of the similar existing character.

After the replacement text is displayed, an optional audible tone may be generated.

The preferred embodiment of the present invention, method and process for on screen text correction via pen interface, is thus described. While the present invention has been described in particular embodiments, it should be appreciated that the present invention should not be construed as limited by such embodiments, but rather construed according to the below claims.

What is claimed is:

1. A method for correcting text comprising the steps of:
   a) displaying a first text portion on a touch-sensitive display screen;
   b) automatically recognizing user input representing handwritten strokes made on said touch-sensitive display screen;
   c) using the display location of said handwritten strokes to associate them with said first text portion;
   d) using similarities between said recognized handwritten strokes and said first text portion to amend said first text portion to produce a second text portion; and
   e) replacing, on said display screen, said first text portion with said second text portion.

2. A method as described in claim 1 wherein said step b) is performed by a user writing said handwritten strokes on said touch-sensitive display screen with a stylus.

3. A method as described in claim 1 wherein said step b) is performed using a cursor to write said handwritten strokes.

4. A method as described in claim 1 wherein said step c) comprises the step of c1) associating said handwritten strokes with said first text portion based on the proximity of said handwritten strokes to said first text portion on said display screen.

5. In a computer system having a touch-sensitive display screen, a method for correcting text comprising the steps of:
- a) displaying a first text portion on said touch-sensitive display screen;
- b) automatically recognizing user input representing handwritten strokes made on said touch-sensitive display screen;
- c) using the display location of said handwritten strokes to associate them with said first text portion;
- d) using similarities between said recognized handwritten strokes and said first text portion to amend said first text portion to produce a second text portion; and
- e) replacing, on said display screen, said first text portion with said second text portion.

6. A method as described in claim 5 wherein said step b) is performed by a user writing said handwritten strokes on said touch-sensitive display screen with a stylus.

7. A method as described in claim 5 wherein said step b) is performed using a cursor to write said handwritten strokes.

8. A method as described in claim 5 wherein said step c) comprises the step of c1) associating said handwritten strokes with said first text portion based on the proximity of said handwritten strokes to said first text portion on said display screen.

9. A method as described in claim 5 wherein said computer system is a PDA.

10. A system for changing displayed data, said system comprising:
- a touch-sensitive display screen capable of displaying a first data portion;
- a processor for recognizing user input representing handwritten strokes made on said touch-sensitive display screen;
- wherein said processor is also for associating the display location of said handwritten strokes with said first data portion;
- wherein said processor is also for using similarities between said recognized handwritten strokes and said first data portion to amend said first data portion to produce a second data portion, and
- wherein said processor is also for replacing said first data portion with said second data portion.

11. A system as described in claim 10 wherein said system is a palmtop computer system.

12. A system as described in claim 10 wherein said handwritten strokes on said touch-sensitive display screen are made with a stylus.

13. A system as described in claim 10 wherein said user input is performed using a cursor.

14. A system as described in claim 10 wherein said processor associates said display location of said handwritten strokes with said first data portion based on the proximity of said handwritten strokes to said first data portion on said display screen.

15. A system as described in claim 10 wherein said processor is also for causing audible tone to be made in conjunction with it replacing said first data portion with said second data portion.

16. A system as described in claim 10 wherein said processor is also for causing audible tone to be made in conjunction with it locating an unambiguous match between at least one recognized handwritten stroke and one character of said first data portion.

* * * * *